United States Patent
Brobst et al.

(10) Patent No.: US 6,427,229 B1
(45) Date of Patent: *Jul. 30, 2002

(54) OBJECT ORIENTED MECHANISM AND METHOD FOR MAINTAINING ELEMENTS ON A FLEXIBLY CONSTRAINED COLLECTION THAT MAY USE ANY SUITABLE OBJECT AS A KEY

(75) Inventors: Curtis Howard Brobst; James Edward Carey, both of Rochester; Bradley William Fawcett, Byron, all of MN (US); Siegfried Wiesenhofer, Wien (AT)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/177,027

(22) Filed: Oct. 22, 1998

(51) Int. Cl.$^7$ ................................................ G06F 9/44
(52) U.S. Cl. ..................... 717/108; 717/107; 717/114; 717/116; 717/117; 717/165; 707/101; 707/102
(58) Field of Search .......................... 717/1, 2, 11, 108, 717/107, 116, 117, 114, 165; 707/101, 102

(56) References Cited

U.S. PATENT DOCUMENTS

| | | | | |
|---|---|---|---|---|
| 5,764,897 A | * | 6/1998 | Khalidi ........................ | 707/10 |
| 5,842,020 A | * | 11/1998 | Faustini ....................... | 345/866 |
| 5,936,860 A | * | 8/1999 | Arnold et al. ................. | 717/1 |
| 6,134,706 A | * | 10/2000 | Carey et al. .................. | 345/853 |
| 6,151,700 A | * | 11/2000 | Fox ............................. | 345/866 |
| 6,195,791 B1 | * | 2/2001 | Carlson et al. ............... | 717/100 |
| 6,230,311 B1 | * | 5/2001 | Gerard et al. ................ | 709/315 |
| 6,275,983 B1 | * | 8/2001 | Orton et al. ................. | 717/116 |

FOREIGN PATENT DOCUMENTS

| | | | | | |
|---|---|---|---|---|---|
| EP | | 841612 A2 | * | 5/1998 | ............. G06F/9/44 |
| EP | | 0 841 612 A2 | * | 5/1998 | ............. G06F/9/44 |
| EP | | 854420 A2 | * | 7/1998 | ............. G06F/9/44 |

OTHER PUBLICATIONS

Joseph Bergin, "Data Abstraction—The Object–Oriented Approach Using++", McGraw–Hill, Inc., Chapter 3, pp. 73–117, 1994.*

Goldberg et al., "Smalltalk–80: The Language", Addison-–Wesley, pp. 132–169, 1989.*

Tromp, "Design Methodology for Class Libraries", Revue HF Tijdschrift, vol. 16, No. 3/4, pp. 3–12, 1992.*

* cited by examiner

Primary Examiner—Gregory Morse
Assistant Examiner—Ted T. Vo
(74) Attorney, Agent, or Firm—Martin & Associates, LLC; Derek P. Martin (57) ABSTRACT

In an object oriented computer system, an object oriented mechanism and method defines a common interface to maintain elements on a collection while providing the capability of using virtually any suitable object as a key to the collection. A programmer defines an interface on a collection that includes suitable object methods for adding, removing, and replacing elements of the collection. The constraints that determine whether elements may be added, removed, or replaced is encapsulated in a policy that is defined by the programmer. The programmer identifies one or more keys, which may include any suitable object in the object oriented system. A maintainer class provides a client interface for maintaining elements on the collection according to the defined policy and according to the keys defined by the programmer. The present invention recognizes the common characteristics that exist in maintaining elements on a keyed collection, and provide predetermined classes and class relationships that provide support for maintaining any collection using any key that a programmer may define.

7 Claims, 5 Drawing Sheets

OBJECT ORIENTED MECHANISM AND METHOD FOR MAINTAINING ELEMENTS ON A FLEXIBLY CONSTRAINED COLLECTION THAT MAY USE ANY SUITABLE OBJECT AS A KEY

BACKGROUND OF THE INVENTION

1. Technical Field

This invention generally relates to object oriented programming and more specifically relates to a mechanism and method for storing and retrieving elements of collections in an object oriented environment.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Many software applications need to operate on data that already exists, and need to store data for later use by another software application. A database is generally used to store persistent data, that is, data that survives beyond the life of a software process that may create, use, or modify the data. Databases are known in the art as persistent storage mechanisms (or simply, persistent stores). Often, data in an object oriented computer system needs to be stored in a "collection", which is a grouping of objects that have one or more common characteristics. A collection is typically defined by an object that stores references to objects that are elements of the collection, and by object methods that allow adding an element, removing an element, and replacing an element in the collection (referred to collectively herein as "maintaining elements" on the collection). One known way to provide a collection defines one or more "keys" that are used to classify data within the collection, and provides intelligence regarding how that elements in the collection may be maintained within the collection itself. However, this approach requires a programmer to custom-define the constraints and the operations for maintaining the collection for each collection in the system. In addition, known containers that are used to store collections may use character strings as a key, but do not have the ability to use object pointers as a key. Thus, a programmer must typically provide a set of limited keys that have unique string identifiers that allows them to be used as keys. These limitations create a significant amount of work for the programmer that needs to provide the capability of maintaining information in a collection using keys in an object oriented program. Without a mechanism for allowing a programmer to flexibly define keys for a collection and constraints on maintenance of elements within the collection, the computer industry will continue to suffer from excessive development costs for object oriented applications that are custom-programmed to support particular key and maintenance constraints with very little reusability of the code.

DISCLOSURE OF INVENTION

In an object oriented computer system, an object oriented mechanism and method defines a common interface to maintain elements on a collection while providing the capability of using virtually any suitable object as a key to the collection. A programmer defines an interface on a collection that includes suitable object methods for adding, removing, and replacing elements of the collection. The constraints that determine whether elements may be added, removed, or replaced is encapsulated in a policy that is defined by the programmer. The programmer identifies one or more keys, which may include any suitable object in the object oriented system. A maintainer class provides a client interface for maintaining elements on the collection according to the defined policy and according to the keys defined by the programmer. The present invention recognizes the common characteristics that exist in maintaining elements on a keyed collection, and provide predetermined classes and class relationships that provide support for maintaining any collection using any key that a programmer may define.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fumdamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requester of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

2. Detailed Description

According to a preferred embodiment of the present invention, an object oriented mechanism and method allow a user to define maintenance constraints and a simple maintenance interface on a collection. The mechanism allows any suitable object to be used as a key to classifying elements (i.e., data) stored in the collection. In this manner, any client object that needs to access data in the collection may use the maintenance interface without requiring that the object contain any intelligence regarding the key scheme or constraints that govern the accessing of data within the collection.

Figure 1:
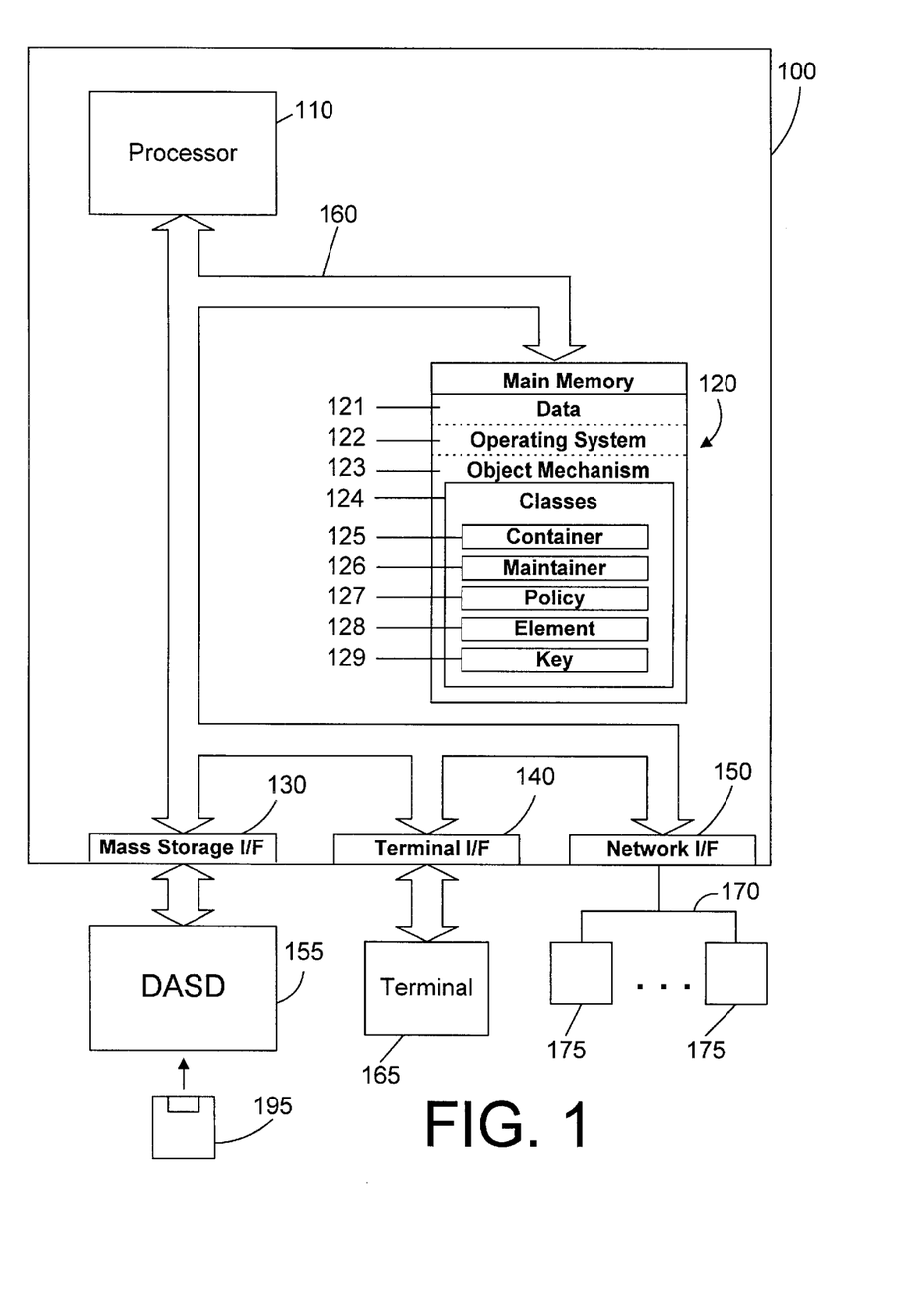
FIG. 1 is a block diagram of an apparatus in accordance with a preferred embodiment of the present invention.

Referring to FIG. 1, a computer system 100 in accordance with the preferred embodiment is an enhanced Windows NT computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 121, an operating system 122, and an object oriented object mechanism 123 in accordance with the preferred embodiments. Object mechanism 123 includes multiple pre-defined classes 124, which include a container class 125, a maintainer class 126, a policy class 127, an element class 128, and a key class 129. While the classes 125–129 are shown in FIG. 1 as residing within the object mechanism 123 according to the preferred embodiment, it is equally within the scope of the invention to have one or more of these classes provided separate from the object mechanism 123.

The container class 125 defines an object oriented container that can hold a collection of object oriented objects. The maintainer class 126 defines logic for adding, removing, and replacing data in the collection stored in an instance of the container class 125. The maintainer class provides the public interface for performing all maintenance on the collection. The policy class 127 defines constraints relating to the maintenance of the collection. For example, the policy class may require that an object be of a certain type before allowing it to be added to the collection. The element class 128 defines elements, or members, of the collection residing within an instance of the container class 125. The key class 129 defines one or more keys that are used to classify instances of the element class 128. Note that instances of key class 129 may be any suitable object, but for the preferred embodiments herein, instances of the key class 129 are persistent objects.

Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 121, operating system 122, and object mechanism 123 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 121 represents any data that serves as input to or output from any program in computer system 100. Operating system 122 is a multitasking operating system known in the industry as Windows NT; however, those skilled in the, art will appreciate that the spirit and scope of the present invention is not limited to any one operating system. Operating system 122 preferably supports an object oriented programming environment such as that provided, for example, by the Java programming language.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122. Operating system 122 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100. Note, however, that while terminal interface 140 is provided to support communication with one or more terminals 165, computer system 100 does not necessarily require a terminal 165, because all needed interaction with users and other processes may occur via network interface 150.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/ Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions shown in main memory 120 may reside on another system and engage in cooperative processing with one or more objects or programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable-type media such as floppy disks (e.g., 195 of FIG. 1) and CD ROM, and transmission type media such as digital and analog communications links.

The remainder of this specification describes the structure and function of object mechanism 123. Object mechanism 123 allows using any object to be used as a key to classifying elements within a collection. Object mechanism 123 segregates the functions relating to the collection according to its classes. The container class 125 holds a collection of instances of the element class 128, with each element being classified according to an instance of the key class 129. The maintainer class 126 contains the logic for adding, removing, and replacing elements in the collection along with any other logic for performing suitable operations on the collection or on elements within the collection. The discussion herein generally refers to the addition, removal, and replacement of elements of the collection for the purpose of illustration, recognizing that maintainer class 126 contains the logic for performing not only these enumerated functions, but any logic for other suitable operations on the collection as well. The policy class 127 defines constraints on the operations of the maintainer. By separating the functions of object mechanism 123 into these classes, a more uniform, flexible, and reusable design results. A programmer may program different constraints in the policy class 127 without changing the logic within the maintainer class 126 and without changing the container class 125. A programmer may use different objects as keys without affecting the container class 125, the maintainer class 126, or the policy class 127. This judicious separation of functions into separate classes provides advantages not found in the prior art. Object mechanism 125 is described below with reference to FIGS. 2–5.

Figure 2:
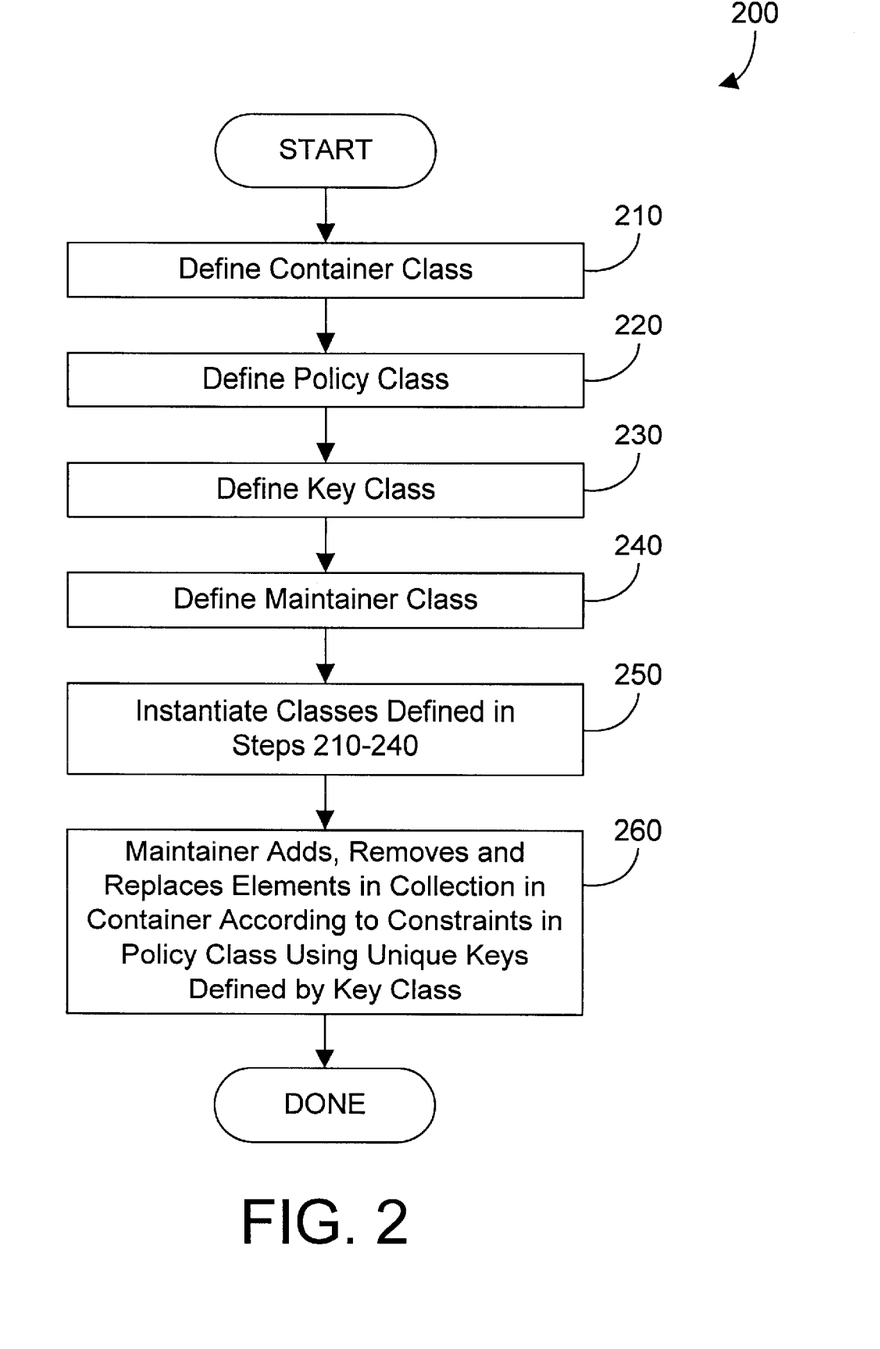
FIG. 2 is a flow diagram showing the steps in defining classes in an object oriented mechanism that maintains elements on a keyed collection using any suitable object as a key, and shows the step of maintaining the keyed collection according to the keys and policies defined by the mechanism.

Referring to FIG. 2, a method 200 provides steps 210–240 that define object mechanism 123, instantiates object mechanism 123 in step 250, then uses object mechanism 123 to maintain elements on the collection in step 260. The first step 210 is to define the container class. The container class is a class that "contains" a collection of objects. In other words, an instance of container class 210 will hold references to multiple objects that make up a collection. The term "collection" herein is used to refer to the group of objects that are stored within an instance of the container class 210, while a "container" is the instance of the container class 125 that holds the collection.

The next step 220 is to define the policy class 127, which defines constraints on the maintenance of the collection that will be stored within an instance of the container class 125. One suitable example of a policy requires that all objects stored in the collection be of a particular type, or implement a particular interface, or contain a particular attribute. If an object does not meet the constraints defined by the policy class 127, it will not be stored in the collection. By providing the policy class 127, the collection is said to be "flexibly constrained" because the policy class 127 may be easily changed or replaced by a user to define new constraints.

The next step 230 is to define the key class 129, which defines classifications of elements (or objects) stored within the collection. For example, if the elements within the collection are employees, the classifications of part-time and full-time may be used, and/or the classifications of hourly and salaried may be used. Each of these classifications would have a corresponding key object (instance of the key class 129) that may be used to classify the elements within the collection.

The next step 240 is to define the maintainer class 126 to provide the internal logic for maintaining the collection using the methods defined by the interface of the container class 125 according to the constraints in the policy class 127 and the keys in the key class 129. At this point the object mechanism 123 has been defined, and the classes that comprise object mechanism 123 are instantiated (step 250). Once the classes are instantiated, the instance of the maintainer class provides a public interface-for any client object or program to add, remove, or replace elements in the collection (step 260) by simply invoking the add( ), remove( ), or replace( ) methods on the maintainer instance. The function of object mechanism 123 in response to the invocation of these methods is described in more detail below, particularly in reference to FIG. 5.

Figure 3:
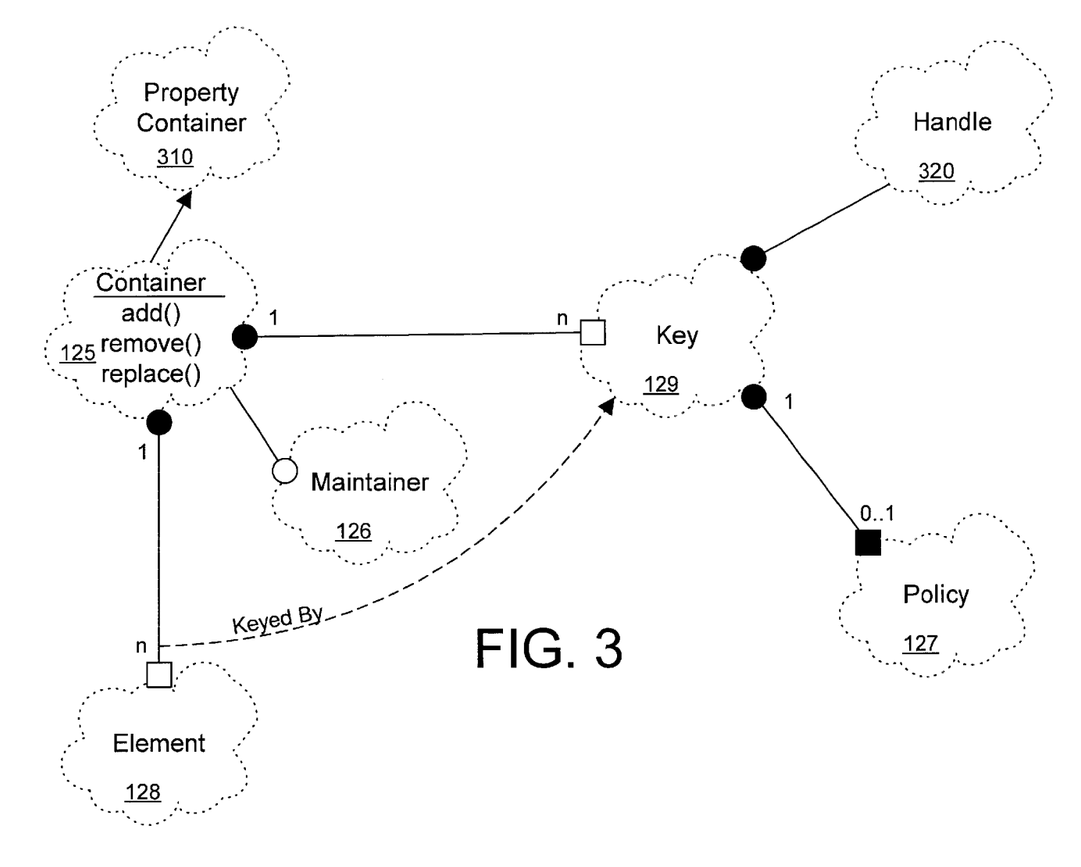
FIG. 3 is a class diagram showing the classes and class relationships for providing collection that encapsulates maintenance constraints and that allows using any suitable object as a key.

Referring now to FIG. 3, a class diagram shows classes within object mechanism 123, which include the classes 125–129 shown in FIG. 1. In addition, container class 125 is shown as a subclass of a PropertyContainer class 310, which represents that many object oriented systems have predefined containers. Container class 125 may be a suitable subclass of a predefined container 310 rather than having to program the container class 125 from scratch. One suitable predefined container that could correspond to PropertyContainer class 310 is disclosed in U.S. Ser. No. 08/927,944 "Property Container Type Objects" filed Sep. 11, 1998. A handle class 320 is also provided, which provides a unique handle identifier instance that is associated with each key instance. The handle class encapsulates a unique persistent object reference that uniquely identifies an object associated with one of its instances. While handle class 320 is explicitly shown for the key class 129 for the purpose of illustrating the present invention, one skilled in the art will recognize that one or more of the other classes within object mechanism 123 may also have corresponding handles.

The container class 125 defines methods that may be invoked to maintain the collection stored within an instance of the container class 125. Examples of suitable methods include add( ), remove( ) and replace( ). Add( ) is invoked to add an element to the collection stored within the container instance, passing the element to be added as a parameter. Remove( ) is invoked to remove an element from the collection stored within the container instance, passing the element to be removed as a parameter. Replace( ) is invoked to replace one element in the collection with a different element, passing both the key of the element to be replaced and the new element as parameters. The container class has a "contains by reference" relationship with the element class 128, indicating that the container holds references to one or more element instances that comprise the collection.

A maintainer class 126 is provided, which defines add( ), remove( ), replace( ) and possibly other methods that are invoked to add, remove, replace, or otherwise maintain elements in the collection that are store in an instance of the container class 125. The maintainer class 126 includes logic that determines if constraints in the policy class allow elements in the collection to be added, removed, or replaced, and further includes logic to classify each element in the collection according to one or more keys defined by the key class 129. The maintainer class 126 has a "uses" relationship with the container class 125, indicating that the internal logic of the maintainer class may invoked methods on the container class. The relationship between the key class 129 and the element class 128 is shown by a dotted line, indicating that each instance of the element class 128 is "keyed by" an instance of the key class 129, which means that each element is classified within the collection according to one or more keys.

The key class 129 defines objects that may be used as keys to classifying the elements within the collection. In the prior art, containers could receive strings as keys, but objects typically could not be used as keys because the objects were dynamically created at run-time and did not have a fixed name and could therefore be used as a key. However, key class 129 has an associated handle class 320. An instance of the handle class 320 is an identifier within an object oriented system that is unique across all objects in the system. By associating a handle with each key, a key maintains a unique identity that remains fixed, even if the name of the key changes. This allows the key handle to be used as an identifier that uniquely identifies the key in the system. This approach allows the key class 129 to be used in conjunction with prior art containers that can only receive string keys by converting a key's handle to a string, and by using the string to classify elements stored in the collection.

The key class has a "contains by value" relationship with the policy class, indicating that each key will have an associated policy associated with it. Note that a key is not required to have an associated policy. If no policy is specified, there will be no constraints on the add( ), remove( ) and replace( ) methods that are used to maintain the collection. The policy class 127 is a policy that determines criteria for maintaining elements on the collection. While the policy class 127 is shown in FIG. 3 as a single class in the preferred embodiment, the present invention extends to any combination of classes or objects that perform the function of providing criteria or constraints on maintaining elements in a collection. One suitable variation could use a chain of responsibility policy scheme, such as that disclosed in U.S. Ser. No. 09/038,352 "Method of Using Decoupled Chain of Responsibility", filed Mar. 11, 1998. In addition, while policy class 127 is shown being contained by the key class 129, the policy class 127 could be attached to the maintainer class 126, the container class 125, the element class 128, or any other suitable class so long as the maintainer class 126 knows how to retrieve an appropriate instance of the policy class 127.

Figure 4:
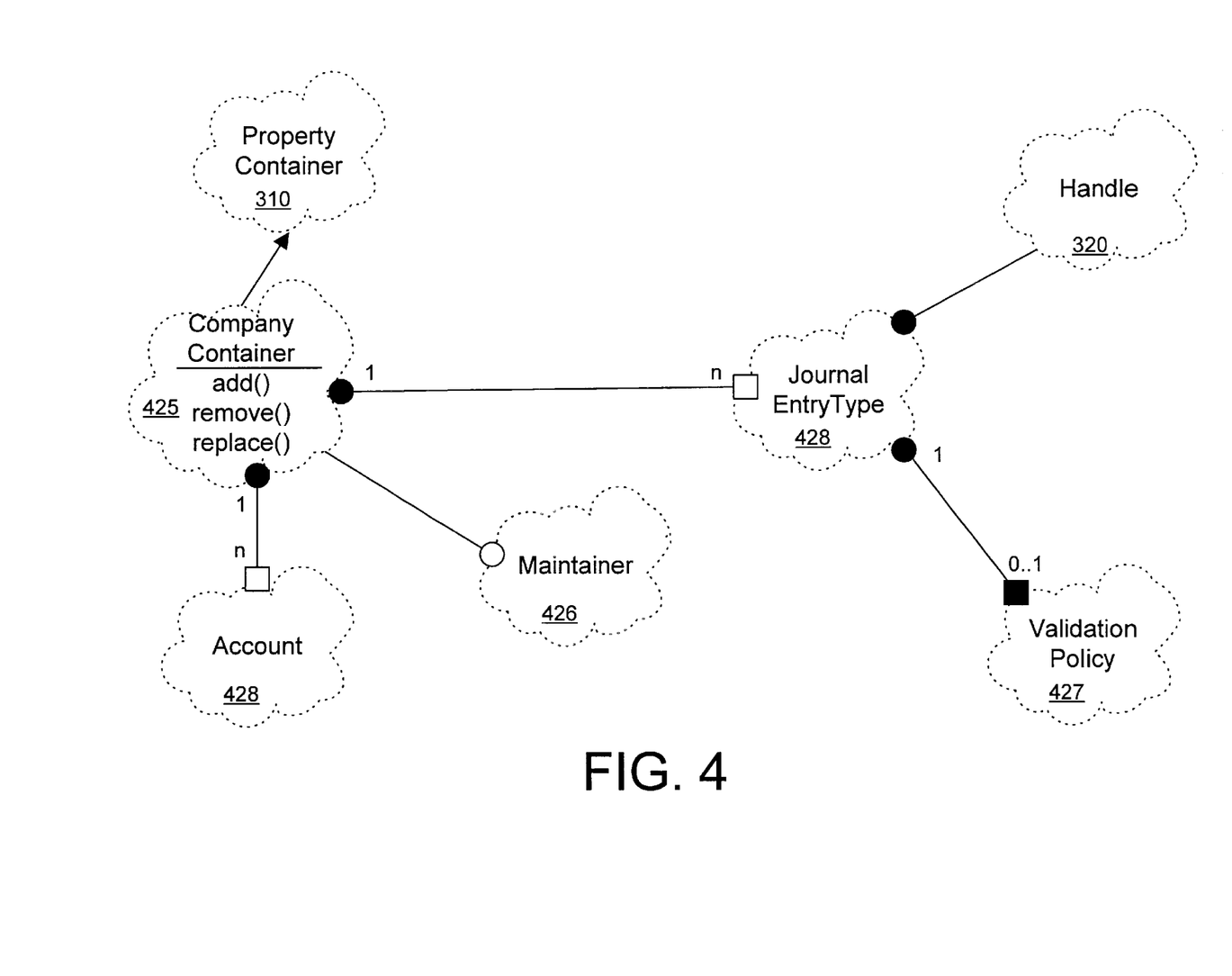
FIG. 4 is a class diagram showing an example of using the classes of FIG. 3 in a specific application.

Referring to FIG. 4, a specific example of the class diagram of FIG. 3 may help to understand to concepts of the preferred embodiment. The specific example of FIG. 4 assumes that a company has a collection of accounts, which are classified according to the type of journal entry that corresponds to the account. A CompanyContainer class 425 is defined as a particular example of a suitable container class. As in FIG. 3, the CompanyContainer class 425 is a subclass of the PropertyContainer class 310, which is a predefined class in some object oriented system. The elements of interest in this example are accounts, represented by the Account class 428. The keys are defined by the JournalEntryType class 428, which has corresponding handles 320. A validation policy 427 contains constraints on the add( ), remove( ) and replace( ) methods that are invoked on the maintainer class 426 to assure that the accounts are properly validated (i.e., allowed for that type of journal entry) before they are performed.

Figure 5:
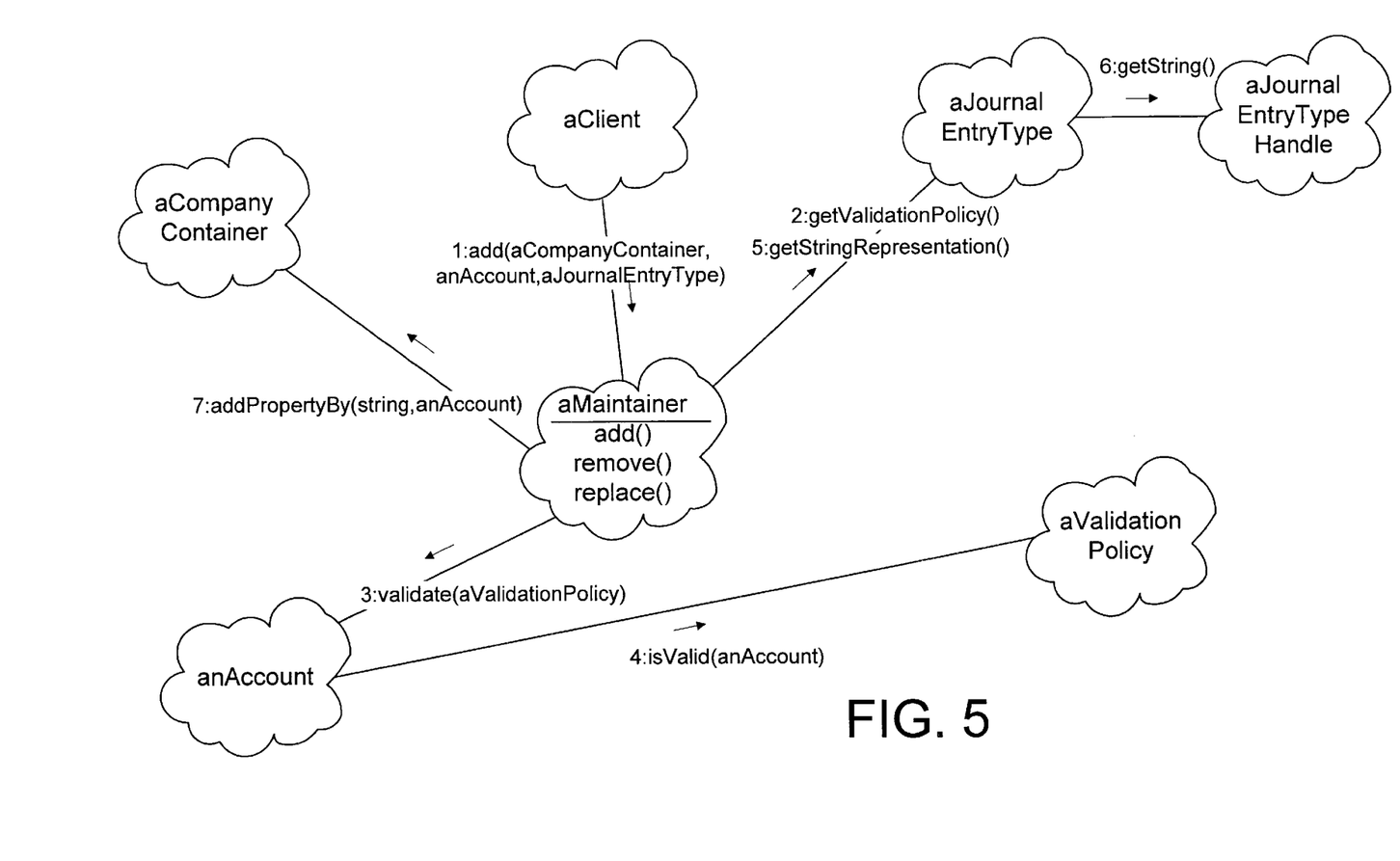
FIG. 5 is an object interaction diagram showing the addition of an element to a collection using the classes of FIG. 4.

The function of an object mechanism 123 as shown in FIG. 4 is best understood with reference to the object interaction diagram of FIG. 5. Each object in FIG. 5 is an instance of the corresponding classes in FIG. 4, with the exception of the aClient object, which represents any object or program that is capable of invoking methods on the aMaintainer object to maintain the collection stored in the aCompanyContainer object. We assume for purposes of illustration that the aClient object first invokes the add( ) method on aMaintainer, passing the container, element, and key as parameters (step 1). This operation in step 1 of FIG. 5 is a request by the aClient object to add an account object named anAccount to the collection stored in aCompanyContainer using aJournalEntryType as the key (or classification) for the anaccount object. In response, the aMaintainer object invokes the getValidationPolicy( ). method on the specified key, aJournalEntryType (step 2). The aMaintainer object then invokes the validate( ) method on the anAccount object, passing the aValidationPolicy object as a parameter (step 3).

Note that the validation in step 3 is only performed if a corresponding validation policy exists.

For the example in FIG. 5, in response to step 3, the anAccount object invokes the isValid( ) method on the aValidationPolicy object (step 4), passing anAccount as a parameter. The isValid( ) method determines whether the anAccount object meets the constraints defined in the aValidationPolicy object. If the anAccount object does not meet the constraints in the aValidationPolicy object, an exception is thrown. If the anAccount object does meet the constraints in the aValidationPolicy object, the anAccount returns an indication to the amaintainer object that the anAccount object has been validated. At this point in time, the aMaintainer has successfully validated the element to be added to the collection.

The aMaintainer object then invokes the getStringRepresentation( ) method on the aJournalEntryType object (step 5). In response, the aJournalEntryType object invokes the getString( ) method on the aJournalEntryTypeHandle object (step 6), which is the unique handle that corresponds to the aJournalEntryType object. In response, thehandle converts its unique identifier into a string and returns the string to the aJournalEntryType object, which in turn returns the string to the aMaintainer object. At this point, the aMaintainer object has obtained the string identifier that identifies the appropriate key object (i.e., aJournalEntryType) that is used to classify the anAccount object, and the anAccount object may be added to the collection with its corresponding key by invoking the addPropertyBy( ) method on the aCompanyContainer object, passing the string of the key and the object to be added (i.e., anAccount) as parameters (step 7). The aCompanyContainer object then adds the anAccount object to its stored collection of objects, along with its corresponding stringified key.

The object mechanism 123 of the present invention provides a great deal of power and flexibility in maintaining elements in collections. First, by providing a validation policy as a separate class, the constraints for maintaining the collection may be changed by simply changing the policy class, without affecting other classes. Second, by providing the capability of converting a unique handle of any suitable object, such as a persistent object, into a string, virtually any object may be used as a key to classify elements in the collection. Because the handle of the object is used as the key, the key for the object will not change, even if the name of the object changes of if its location in memory changes. Third, the object mechanism 123 may be used without affecting containers that are already defined, even if the containers can only key elements using strings, because the mechanism 123 provides the capability of providing a unique string that corresponds to any key object. Fourth, the client interface for maintaining the collection and the logic for interacting with the elements and policy is all contained within the maintainer class. Of course, other advantages that are not specifically recited herein will be apparent to one skilled in the art.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention.

We claim:

1. An apparatus comprising:
    at least one processor;
    a memory coupled to the at least one processor;
    an object oriented object mechanism residing in the memory and executed by the at least one processor, the object mechanism including:
        a container class that contains a collection of elements;
        a maintainer class that defines a maintenance interface to maintain elements on the collection, the maintainer class using the interface of the container class to maintain the collection;
        a key class that defines at least one key object for the collection, each key object having a corresponding unique identifier and being assigned to one of the elements in the collection, the key class defining at least one object method for converting the unique identifier to a corresponding character string; and
        a policy class that specifies at least one constraint on the maintenance of the elements in the collection;
    wherein an instance of the maintainer class is invoked to create a new object in the collection according to a specified key object, and in response, the instance of the maintainer class creates the new object, invokes the at least one object method on a the specified key object to convert the unique identifier for the specified key object to a corresponding character string, and stores the new object in the collection using the character string as a key.

2. The apparatus of claim 1 wherein the unique identifier comprises an object handle that corresponds to the key object.

3. A method for maintaining elements in a collection, the method comprising the steps of:
    defining a container class that contains the collection of elements;
    defining a policy class that specifies at least one constraint on the maintenance of the elements in the collection;
    defining a key class that defines at least one key object to the collection, each key object having a corresponding unique identifier and being assigned to one of the elements in the collection, the key class defining at least one object method for converting the unique identifier to a corresponding character string;

defining a maintainer class that includes at least one method that comprises the interface, the maintainer class using the interface of the container class to maintain the collection;

instantiating the container class, the policy class, the key class, and the maintainer class; and invoking the instance of the maintainer class to create a new object in the collection according to a specified key object, and in response, the instance of the maintainer class creates the new object, invokes the at least one object method on a the specified key object to convert the unique identifier for the specified key object to a corresponding character string, and stores the new object in the collection using the character string as a key.

4. A program product comprising:

(A) an object oriented object mechanism including:

a container class that contains a collection of elements;

a maintainer class that defines a maintenance interface to maintain elements on the collection, the maintainer class using the interface of the container class to maintain the collection;

a key class that defines at least one key object for the collection, each key object having a corresponding unique identifier and being assigned to one of the elements in the collection, the key class defining at least one object method for converting the unique identifier to a corresponding character string;

a policy class that specifies at least one constraint on the maintenance of the elements in the collection;

wherein an instance of the maintainer class is invoked to create a new object in the collection according to a specified key object, and in response, the instance of the maintainer class creates the new object, invokes the at least one object method on a the specified key object to convert the unique identifier for the specified key object to a corresponding character string, and stores the new object in the collection using the character string as a key; and (B) signal bearing media bearing the object mechanism.

5. The program product of claim 4 wherein the signal bearing media comprises recordable media.

6. The program product of claim 4 wherein the signal bearing media comprises transmission media.

7. The program product of claim 4 wherein the unique identifier comprises an object handle that corresponds to the key object.

* * * * *